(12) United States Patent
Svensson

(10) Patent No.: US 11,702,999 B2
(45) Date of Patent: Jul. 18, 2023

(54) VAPORIZING METHANOL USING EXHAUST GAS AND AN ELECTRICAL HEATING COMPONENT

(71) Applicant: Caterpillar Inc., Peoria, IL (US)

(72) Inventor: Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/643,640

(22) Filed: Dec. 10, 2021

(65) Prior Publication Data

US 2023/0184180 A1 Jun. 15, 2023

(51) Int. Cl.
*F02D 19/06* (2006.01)

(52) U.S. Cl.
CPC ..... *F02D 19/0602* (2013.01); *F02D 19/0628* (2013.01); *F02D 19/0665* (2013.01); *F02D 19/0668* (2013.01); *F02D 19/0673* (2013.01)

(58) Field of Classification Search
CPC ............. F02D 19/0602; F02D 19/0628; F02D 19/0665; F02D 19/0668; F02D 19/0673
See application file for complete search history.

(56) References Cited

U.S. PATENT DOCUMENTS

| 4,424,771 | A | 1/1984 | Lovercheck |
| 8,869,778 | B2 | 10/2014 | Kim et al. |
| 8,935,079 | B2 | 1/2015 | Tsunooka et al. |
| 2011/0023476 | A1* | 2/2011 | Havel ............ F01K 3/00 60/407 |

FOREIGN PATENT DOCUMENTS

| CN | 102039814 A | * | 5/2011 |
| CN | 207673468 U | | 7/2018 |
| CN | 111520259 A | | 8/2020 |
| JP | S59099047 A | * | 11/1982 |
| JP | 5629341 B2 | | 11/2014 |
| TW | 201317439 A | | 5/2013 |

* cited by examiner

*Primary Examiner* — Jacob M Amick
*Assistant Examiner* — Charles J Brauch
(74) *Attorney, Agent, or Firm* — Harrity & Harrity, LLP

(57) ABSTRACT

A system may include a first methanol tank and a second methanol tank connected to the first tank. The system may include a first valve fluidly connected to the first methanol tank and the second methanol tank. The system may include a heat exchanger connected to the second methanol tank and a turbine of a turbocharger. The system may include a second valve fluidly connected to an intake system of an engine.

20 Claims, 2 Drawing Sheets

VAPORIZING METHANOL USING EXHAUST GAS AND AN ELECTRICAL HEATING COMPONENT

TECHNICAL FIELD

The present disclosure relates generally to vaporizing methanol and, for example, to vaporizing methanol using exhaust gas and/or an electrical heating component.

BACKGROUND

Due to a high latent heat of vaporization of methanol, vaporizing methanol prior to the methanol reaching a cylinder of an engine is a difficult task, especially when attempting to inject the methanol into an intake system of the engine. Methanol droplets may not be vaporized within a sufficient amount of time prior to reaching the cylinder (due to the latent heat of vaporization of methanol), even with a sufficient amount of energy in an air stream associated with the intake system. In other words, the methanol droplets may not be vaporized prior to reaching the cylinder. Methanol droplet size and relatively cold temperatures of components (associated with the intake system) further exacerbate the difficulty of vaporizing the methanol prior to the methanol reaching the cylinder.

China Utility Model No. CN207673468U (the '468 reference) discloses a kind of feeder of alcohol based liquid gas on gas turbines and internal combustion engines. The '468 reference further discloses that, to realize the driving of an internal combustion engine, the present apparatus heats gasifying pot using the waste heat of engine exhaust gas.

While the '468 reference discloses gasifying pot using the waste heat of engine exhaust gas, the '468 reference does not specifically address the latent heat of vaporization of methanol which complicates the vaporization of methanol prior to the methanol reaching a cylinder of an engine.

The system of the present disclosure solves one or more of the problems set forth above and/or other problems in the art.

SUMMARY

In some implementations, a system includes a first tank containing methanol; a second tank configured to receive a portion of the methanol from the first tank; a heat exchanger configured to provide heat, from exhaust gas, to the second tank to increase a temperature of the portion of the methanol, in the second tank, to generate vaporized methanol, and wherein a pressure of the vaporized methanol causes the vaporized methanol to be provided to an intake system associated with an engine; and a valve configured to cause a portion of the vaporized methanol, in the second tank, to be provided to the first tank to reduce at least one of a temperature of the vaporized methanol or the pressure of the vaporized methanol.

In some implementations, a system includes a first methanol tank; a second methanol tank connected to the first methanol tank; a first valve fluidly connected to the first methanol tank and the second methanol tank; a heat exchanger connected to the second methanol tank and an exhaust stream exiting a turbine of a turbocharger; and a second valve (e.g., a gas admission valve) fluidly connected to the second methanol tank and an intake system of an engine.

In some implementations, a system includes an engine; a first tank containing methanol; a second tank containing a portion of the methanol from the first tank; a heat exchanger configured to provide exhaust gas, from a turbine of a turbocharger, to the second tank to increase a temperature of the portion of the methanol in the second tank, to generate vaporized methanol, wherein a pressure of the vaporized methanol causes the vaporized methanol to be provided from the second tank to an intake system associated with the engine; a valve configured to control a flow of a portion of the vaporized methanol from the second tank to the first tank; and a controller configured to control an operation of the valve.

DETAILED DESCRIPTION

The present disclosure relates to a system for vaporizing methanol that is provided to an intake system associated with an engine. For example, the system may include a first methanol tank containing methanol and a second methanol tank fluidly connected to the first methanol tank. The second methanol tank may be configured to receive a portion of the methanol from the first methanol tank. The system may further include a heat exchanger connected to the second methanol tank and to a turbine of a turbocharger. The heat exchanger may be configured to provide heat, from exhaust gas from the turbine, to the second methanol tank. In some implementations, heat may be provided from anywhere in the exhaust stream. For example, heat may be provided from an exhaust manifold to the second methanol tank.

The heat may increase a temperature of the portion of the methanol, in the second methanol tank, to generate vaporized methanol. For example, the portion of the methanol, in the second methanol tank, may be heated to a temperature above its boiling point. As a result of increasing the temperature, a pressure of the vaporized methanol may be sufficient to admit the vaporized methanol (e.g., pressurized vapor of methanol) into the intake system via a gas admission valve (GAV) or a solenoidal gas admission valve (SOGAV). The system may further include an electrical heating component to provide additional or supplemental heat with respect to the heat provided via the heat exchanger (e.g., from the exhaust gas via the turbine and/or from the exhaust stream). The electrical heating component may provide heat when a temperature associated with the engine (e.g., an exhaust temperature) does not satisfy an engine temperature threshold (e.g., when the temperature associated with the engine is a cold temperature) and/or in the event a load associated with the engine does not satisfy an engine load threshold.

By increasing the temperature of methanol using heat from an exhaust stream (exiting the turbine of the turbocharger) and/or heat from the electrical heating component, the system may ensure that the methanol in the second methanol tank is vaporized prior to the methanol being provided to a cylinder of the engine. The system may further include a valve configured to cause a portion of the vaporized methanol, in the second methanol tank, to be provided to the first methanol tank to reduce a temperature of the vaporized methanol and/or the pressure of the vaporized methanol in the second methanol tank. As the vaporized methanol is provided to the first methanol tank, the vaporized methanol will experience condensation and, accordingly, the vaporized methanol may return to a liquid form.

Figure 1:
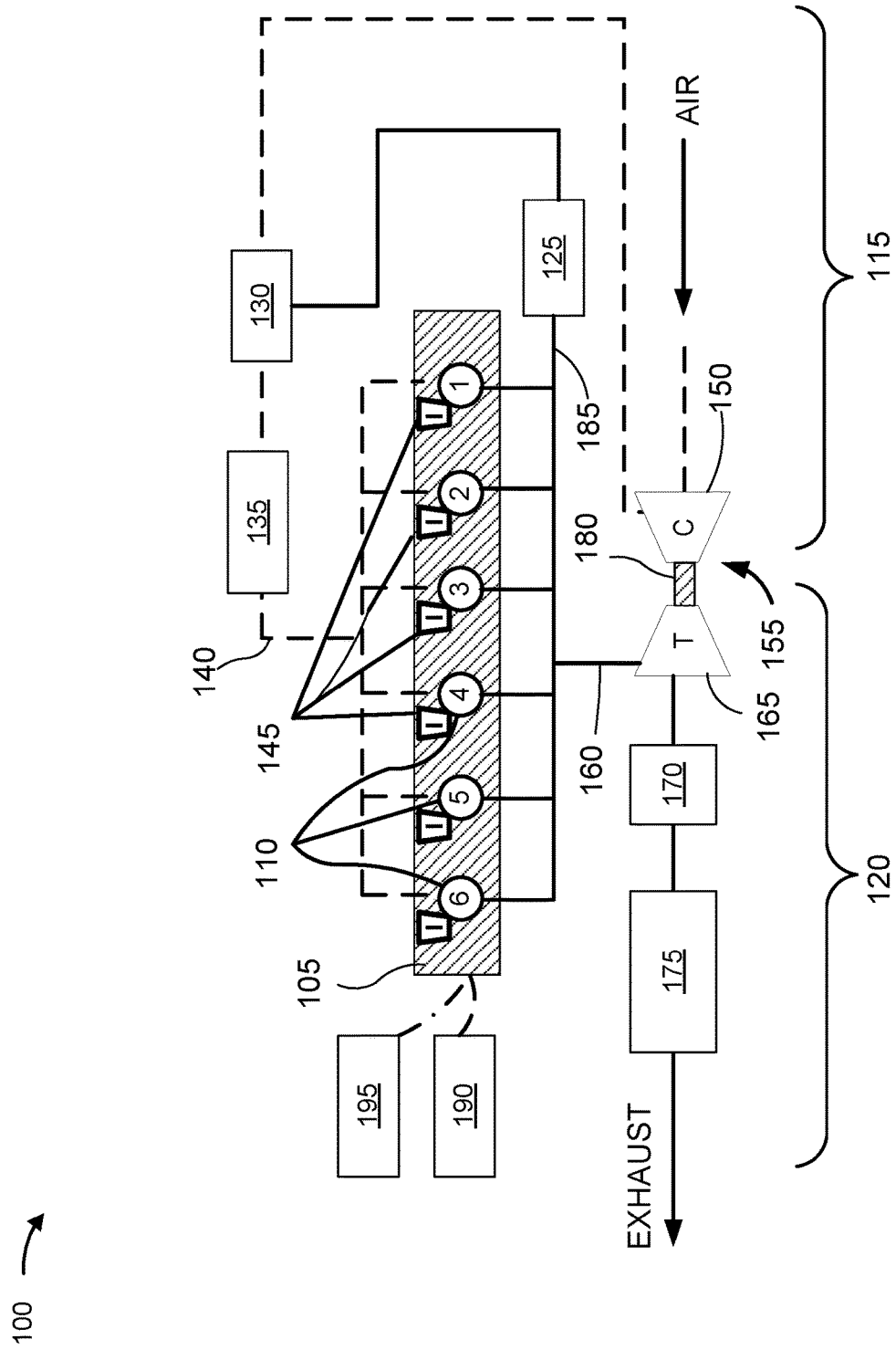
FIG. 1 is a diagram of an example power system described herein.

FIG. 1 is a diagram of an example power system 100 described herein. The power system 100 may be described herein as a compression ignition, internal combustion engine. However, the power system 100 may include any other type of internal combustion engine, such as, for example, a spark, laser, or plasma ignition engine. The power system 100 may be fueled by such fuels as distillate diesel fuel, biodiesel, dimethyl ether, alcohol, ethanol, methanol, gaseous fuels, such as hydrogen, natural gas, propane, and/or any combination thereof.

Power system 100, of FIG. 1, includes an engine block 105 (referred to herein as "engine 105") with a plurality of cylinders 110 (engine 105 of FIG. 1 is shown with six cylinders 110). A piston assembly may be included within each of cylinders 110 to form a combustion chamber within each cylinder 110. Power system 100 may include any number of combustion chambers and the combustion chambers may be disposed in an in-line configuration, a "V" configuration, or in any other suitable configuration.

Power system 100 may include multiple systems. For example, as shown in the example of FIG. 1, power system 100 may include an air intake or air intake system 115, an exhaust system 120, and an exhaust gas recirculation (EGR) system 125. Air intake system 115 may be configured to direct air, or an air and fuel mixture (e.g., of air and another gas, such as exhaust gas) into power system 100 for subsequent combustion. Exhaust system 120 may exhaust or release products of the combustion to an atmosphere external to power system 100. A recirculation loop of the EGR system 125 may be configured to direct a portion of the exhaust gases from exhaust system 120 back into air intake system 115 for subsequent combustion.

Air intake system 115 may include multiple components that coordinate to condition and introduce compressed air into cylinders 110. For example, air intake system 115 may include a mixer 130, an intake throttle valve (ITV 135), and/or intake manifold 140, located downstream of a compressor 150 of a turbocharger 155. The air intake system 115 feeds air to variably actuated valves 145 associated with respective ones of cylinders 110. In some examples, power system 100 may include a standard cam providing fixed valve timing. In some implementations, air intake system 115 may include an air cooler, a filtering component, and/or a compressor bypass component, among other examples.

Exhaust system 120 may include multiple components that cooperate to condition and direct exhaust from cylinders 110 to the atmosphere. For example, exhaust system 120 may include an exhaust passageway 160, a turbine 165 driven by exhaust flowing through exhaust passageway 160, a particulate collection device 170, such as a diesel particulate filter (DPF) located downstream of turbine 165, and an exhaust aftertreatment device 175 (e.g., an aftertreatment selective catalytic reduction (SCR) component) fluidly connected to the particulate collection device 170.

Turbine 165 may be located to receive exhaust leaving cylinders 110 and may be connected to compressor 150 of air intake system 115 by way of a turbocharger shaft 180 to form turbocharger 155. Turbocharger shaft 180 may be a common shaft of turbine 165 and compressor 150 such that a rotational speed of turbine 165 corresponds to a rotational speed of compressor 150. As described herein, a rotational speed of turbocharger 155 may correspond to or be based on the rotational speed of turbocharger shaft 180. As exhaust gases exiting cylinders 110 flow through turbine 165 and expand against vanes thereof, turbine 165 may rotate and drive compressor 150 to pressurize inlet air to mixer 130.

Exhaust aftertreatment device 175 may receive exhaust from turbine 165 and trap or convert particular constituents in the gas stream. In one example, exhaust aftertreatment device 175 may embody an SCR component having a catalyst substrate located downstream from a reductant injector. In some situations, a portion of the exhaust gas may be provided, via a conduit 185, into EGR system 125.

Power system 100 of FIG. 1 includes a controller 190 and a sensor system 195. In some examples, controller 190 may include an electronic control module (ECM). Controller 190 may control an operation of one or more components associated with power system 100, as described herein. For example, controller 190 may control an opening and/or a closing of one or more valves, control an operation of a pump, and/or control an operation of an electrical heating component, as described herein.

Controller 190 may execute instructions to perform various control functions and processes to control power system 100. Controller 190 may include any appropriate type of engine control system configured to perform engine control functions such that power system 100 may operate properly. Further, controller 190 may also control another system of a vehicle or machine, such as a transmission system, a hydraulics system, and/or the like.

Sensor system 195 may provide data used by controller 190 to control the operation of the one or more components associated with power system 100, as described herein. Sensor system 195 may include physical sensor devices and/or virtual sensors and/or any appropriate type of measurement system that generate data based on a computational model and/or one or more measured values. The data may include temperature data, pressure data, flow rate data, among other examples.

As indicated above, FIG. 1 is provided as an example. Other examples are possible and may differ from what was described in connection with FIG. 1.

Figure 2:
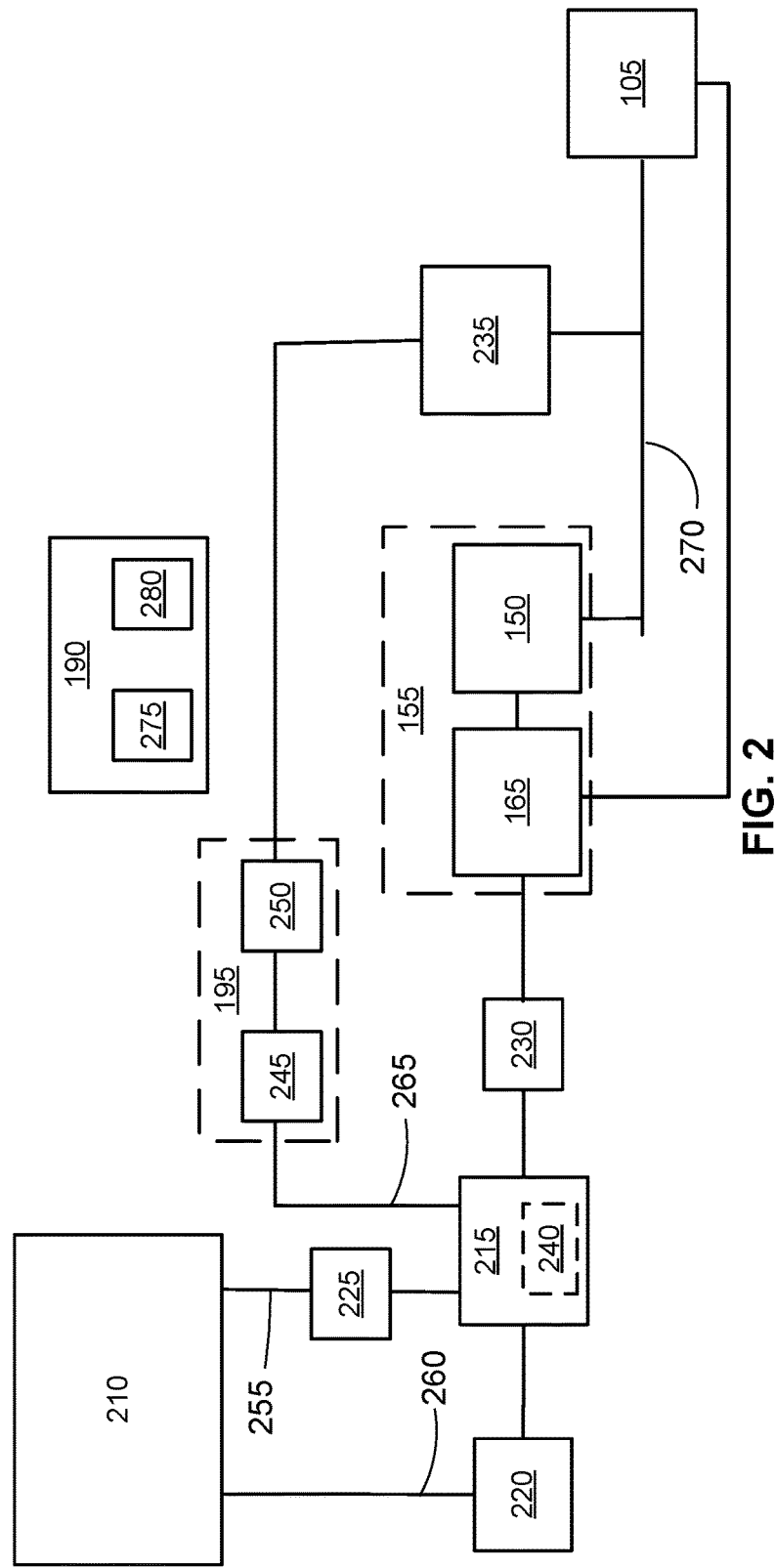
FIG. 2 is a diagram of an example power system described herein.

FIG. 2 is a diagram of an example power system 200 described herein. As shown in FIG. 2, power system 200 includes engine 105, compressor 150, turbocharger 155, turbine 165, controller 190, and sensor system 195. These elements of power system 200 have been described above in connection with FIG. 1. As shown in FIG. 2, power system 200 further includes a first methanol tank 210, a second methanol tank 215, a first valve 220, a pump 225, a heat exchanger 230, a second valve 235, an electrical heating component 240, a temperature sensor device 245, and a pressure sensor device 250. In some implementations, one or more fuel lines and/or conduits described herein may include a double wall pipe.

First methanol tank 210 may include a container that is configured to contain methanol. The methanol, in first methanol tank 210, may be provided in liquid form (e.g., provided at ambient temperature and ambient pressure). In some situations, the methanol in first methanol tank 210 may be pre-heated. Second methanol tank 215 may include a container that is configured to receive a portion of the methanol from first methanol tank 210. The portion of the methanol, in second methanol tank 215, may be heated to generate vaporized methanol, as explained herein. As shown in FIG. 2, second methanol tank 215 may be connected to first methanol tank 210 via a first fuel line 255 and a second fuel line 260. First fuel line 255 may be a conduit configured to provide the portion of the methanol from first methanol tank 210 to second methanol tank 215 via pump 225. Pump 225 may be configured to control a flow of the portion of the methanol from first methanol tank 210 to second methanol tank 215.

Second fuel line 260 may be a conduit configured to provide the vaporized methanol from second methanol tank 215 to first methanol tank 210 via first valve 220. In some situations, a cooling component may be connected to second fuel line 260. The cooling component (e.g., a cooler) may be configured to reduce a temperature of the vaporized methanol from second methanol tank 215. In some examples, first valve 220 may include a relief valve that is configured to control a flow of a portion of the vaporized methanol from second methanol tank 215 to first methanol tank 210. For example, first valve 220 may be opened to cause the portion of the vaporized methanol to be provided to first methanol tank 210 to reduce a pressure of the vaporized methanol in the second methanol tank 215 and/or reduce a temperature of the vaporized methanol in second methanol tank 215.

As shown in FIG. 2, second methanol tank 215 may be connected to heat exchanger 230 and heat exchanger 230 may be connected to turbine 165. Heat exchanger 230 may include one or more devices configured to provide (or transfer) heat between two or more components. For example, heat exchanger 230 may be configured to provide a portion of heat (e.g., from exhaust gas generated by engine 105 and passing through turbine 165) to second methanol tank 215. The portion of the exhaust gas, provided to heat second methanol tank 215, may increase a temperature of the portion of the methanol, contained in second methanol tank 215, and accordingly generate the vaporized methanol. For example, heat exchanger 230 may receive wasted heat from turbine 165 and provide the wasted heat to second methanol tank 215 to increase the temperature of the portion of the methanol in second methanol tank 215.

As shown in FIG. 2, second methanol tank 215 may be fluidly connected to second valve 235 via a third fuel line 265. Third fuel line 265 may include a conduit configured to provide the vaporized methanol from second methanol tank 215 to second valve 235. In some implementations, third fuel line 265 may include a double wall pipe. In some examples, the pressure of the vaporized methanol may cause the vaporized methanol to be provided to air intake system 115 associated with engine 105, via second valve 235. In other words, the pressure of the vaporized methanol may be sufficient to admit the vaporized methanol (e.g., pressurized methanol vapor) into air intake system 115 using second valve 235.

In some examples, second valve 235 may include a GAV or a SOGAV. As shown in FIG. 2, second valve 235 and compressor 150 may be connected to air intake system 115 via a conduit 270.

In some examples, electrical heating component 240 may provide heat to the portion of the methanol provided to second methanol tank 215 (e.g., in conjunction with the heat, from the exhaust gas, provided to the portion of the methanol provided to second methanol tank 215 via heat exchanger 230). For instance, electrical heating component 240 may be configured to provide additional or supplemental heat in the event a temperature associated with engine 105 does not satisfy an engine temperature threshold and/or in the event a load associated with engine 105 does not satisfy an engine load threshold. The temperature may include coolant temperature, exhaust temperature, among other examples.

Electrical heating component 240 may include one or more devices configured to generate heat. For example, electrical heating component 240 may include a cartridge heater, a heating tape, a resistance heater, among other examples. As shown in FIG. 2, electrical heating component 240 may be provided in second methanol tank 210. Additionally, or alternatively, electrical heating component 240 may be provided in first methanol tank 210 and may be configured to increase a temperature of the portion of the methanol provided to second methanol tank 215, prior to the portion of the methanol exiting first methanol tank 210.

Additionally, or alternatively, electrical heating component 240 may be provided on first fuel line 255 (e.g., between pump 225 and second methanol tank 215). For example, electrical heating component 240 may be wrapped around first fuel line 255 and may be configured to increase a temperature of the portion of the methanol provided to second methanol tank 215, prior to the portion of the methanol being provided to second methanol tank 215. Additionally, or alternatively to being provided on first fuel line 255, electrical heating component 240 may be connected to heat exchanger 230. In this regard, electrical heating component 240 may be configured to provide additional heat with respect to heat provided by heat exchanger 230 and received from the exhaust gas.

Temperature sensor device 245 may include one or more devices capable of sensing, detecting, and/or measuring a temperature of the vaporized methanol exiting second methanol tank 215 (e.g., the temperature of the vaporized methanol on third fuel line 265) and generating temperature data indicating the temperature. Pressure sensor device 250 may include one or more devices capable of sensing, detecting, and/or measuring a pressure of the vaporized methanol exiting second methanol tank 215 (e.g., the pressure of the vaporized methanol on third fuel line 265).

Controller 190 may be configured to control an operation of first valve 220, second valve 235, electrical heating component 240, among other components of power system 200, as explained herein. For example, controller 190 may be configured to control an operation of first valve 220, second valve 235, electrical heating component 240, among other components of power system 200, based on the temperature data and/or the pressure data.

In some implementations, when controlling the operation of first valve 220, controller 190 may be configured to control first valve 220 to cause the portion of the vaporized methanol to be provided from second methanol tank 215 to first methanol tank 210 when the temperature data indicates that the temperature of the vaporized methanol exceeds a first temperature threshold or when the pressure data indicates that the pressure of the vaporized methanol exceeds a first pressure threshold. For example, controller 190 may be configured to cause first valve 220 to be opened when the temperature data indicates that the temperature of the vaporized methanol exceeds the first temperature threshold or when the pressure data indicates that the pressure of the vaporized methanol exceeds the first pressure threshold. Alternatively, controller 190 may be configured to cause first valve 220 to be closed when the temperature data indicates that the temperature of the vaporized methanol does not exceed a second temperature threshold (that is less than the first temperature threshold) or when the pressure data indicates that the pressure of the vaporized methanol does not exceed a second pressure threshold.

In some implementations, when controlling the operation of second valve 235, controller 190 may be configured to control a duration of an opening of second valve 235 based on the temperature data and/or the pressure data. For example, the duration may be a function of the temperature data and/or the pressure data. For instance, assuming each of the temperature of the vaporized methanol and the pressure of the vaporized methanol is changed independently, the duration may increase as the temperature of the vaporized methanol increases or as the pressure of the vaporized methanol decreases. Conversely, the duration may decrease as the temperature of the vaporized methanol decreases or as the pressure of the vaporized methanol increases.

In some implementations, when controlling the operation of electrical heating component 240, controller 190 may be configured to cause electrical heating component 240 to be activated and generate heat when the temperature data indicates that the temperature of the vaporized methanol does not exceed a third temperature threshold and/or when the pressure data indicates that the pressure of the vaporized methanol does not exceed a third pressure threshold. Alternatively, controller 190 may be configured to cause electrical heating component 240 to be deactivated and suspend generating heat when the temperature data indicates that the temperature of the vaporized methanol exceeds a fourth temperature threshold or when the pressure data indicates that the pressure of the vaporized methanol exceeds a fourth pressure threshold.

As shown in FIG. 2, controller 190 may include a memory 275 and a processor 280. Memory 275 includes a random-access memory (RAM), a read only memory (ROM), and/or another type of dynamic or static storage device (e.g., a flash memory, a magnetic memory, and/or an optical memory) that stores information and/or instructions for use by processor 280 to perform a function, such as controlling an operation of one or more components of power system 200, as described herein.

Processor 280 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 280 is implemented in hardware, firmware, and/or a combination of hardware and software. Processor 280 may be capable of being programmed to perform a function, such as controlling an operation of one or more components of power system 200, as described herein.

In some implementations, power system 200 may further include a pressure regulator configured to control the pressure of the vaporized methanol provided to second valve 235. For example, the pressure regulator may be provided, on third fuel line 265, downstream with respect to sensor system 195. The pressure regulator may be configured to prevent the pressure of the vaporized methanol from exceeding a fifth pressure threshold different than the thresholds discussed above. In some implementations, the pressure regulator may be controlled by controller 190 based on the pressure data. For example, controller 190 may cause the pressure regulator to reduce the pressure of the vaporized methanol when the pressure data indicates that the pressure of the vaporized methanol exceeds the fifth pressure threshold.

While the foregoing example has been described with respect to methanol, the example is applicable to other alcohol fuels such as ethanol, other similar fuel source, and/or any combination thereof. As indicated above, FIG. 2 is provided as an example. Other examples are possible and may differ from what was described in connection with FIG. 2.

INDUSTRIAL APPLICABILITY

The present disclosure relates to a system for vaporizing methanol that is provided to an intake system associated with an engine. For example, the system may include a first methanol tank containing methanol and a second methanol tank connected to the first methanol tank. The second methanol tank is configured to receive a portion of the methanol from the first methanol tank. The system may include a heat exchanger connected to the second methanol tank and to a turbine of a turbocharger. The heat exchanger may be configured to provide heat, from exhaust gas from the turbine, to the second methanol tank. The system may further include an electrical heating component to provide additional or supplemental heat with respect to the heat provided via the heat exchanger.

Typically, due to a latent heat of vaporization of methanol, vaporizing methanol prior to the methanol reaching a cylinder of an engine is a difficult task, especially when attempting to inject the methanol into an intake system of the engine. For example, methanol droplets may not be vaporized within a sufficient amount of time prior to reaching the cylinder.

In contrast, by increasing the temperature of methanol using heat from the exhaust gas and/or heat from the electrical heating component, the system may ensure that the methanol is vaporized prior to the methanol being provided to a cylinder of the engine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
a first tank containing methanol;
a second tank configured to receive a portion of the methanol from the first tank;
a heat exchanger configured to provide heat, from an exhaust gas to the second tank to increase a temperature of the portion of the methanol, in the second tank, to generate vaporized methanol,
   wherein the heat exchanger is external with respect to the second tank, and
   wherein a pressure of the vaporized methanol causes the vaporized methanol to be provided to an intake system associated with an engine; and
a valve configured to cause a portion of the vaporized methanol, in the second tank, to be provided to the first tank to reduce at least one of a temperature of the vaporized methanol or the pressure of the vaporized methanol.

2. The system of claim 1, further comprising:
a pump configured to control a flow of the portion of the methanol from the first tank to the second tank.

3. The system of claim 1, wherein the valve is a first valve, and
wherein the vaporized methanol is provided to the intake system via a second valve.

4. The system of claim 3, wherein the second valve includes a gas admission valve (GAV) or a solenoidal gas admission valve (SOGAV).

5. The system of claim 4, further comprising:
a temperature sensor device configured to provide temperature data indicating the temperature of the vaporized methanol exiting the second tank;
a pressure sensor device configured to provide pressure data indicating the pressure of the vaporized methanol exiting the second tank; and
a controller configured to:
   receive at least one of the temperature data or the pressure data;
   control an operation of the first valve based on at least one of the temperature data or the pressure data; and
   control an operation of the second valve based on the at least one of the temperature data or the pressure data.

6. The system of claim 5, wherein, to control the operation of the second valve, the controller is configured to:
control a duration of an opening of the second valve based on the at least one of the temperature data or the pressure data.

7. The system of claim 1, further comprising:
an electrical heating component configured to provide heat to the second tank in conjunction with the heat from the exhaust gas.

8. A system, comprising:
a first methanol tank;
a second methanol tank connected to the first methanol tank;
a first valve fluidly connected to the first methanol tank and the second methanol tank;
a heat exchanger connected to the second methanol tank and an exhaust stream exiting a turbine of a turbocharger,
   wherein the heat exchanger is external with respect to the second methanol tank; and
a second valve fluidly connected to the second methanol tank and an intake system of an engine.

9. The system of claim 8, wherein the second valve includes a gas admission valve (GAV) or a solenoidal gas admission valve (SOGAV).

10. The system of claim 8, wherein the first valve is fluidly connected to the first methanol tank and the second methanol tank via a first fuel line,
wherein the second methanol tank is connected to the first methanol tank via a second fuel line, and
wherein the system further comprises:
   a pump connected to the first methanol tank and the second methanol tank via the second fuel line.

11. The system of claim 8, further comprising:
an electrical heating component,
   wherein the electrical heating component is provided in the first methanol tank,
   wherein the electrical heating component is provided in the second methanol tank,
   wherein the electrical heating component is provided on a fuel line connecting the first methanol tank and the second methanol tank, or
   wherein the electrical heating component is connected to the heat exchanger.

12. The system of claim 8, further comprising:
a controller configured to:
   control an operation of the first valve; and
   control an operation of the second valve.

13. The system of claim 8, further comprising:
a electrical heating component; and
a controller configured to:
   control an operation of the electrical heating component.

14. A system, comprising:
an engine;
a first tank containing methanol;
a second tank containing a portion of the methanol from the first tank;
a heat exchanger configured to provide heat, from exhaust gas, to the second tank to increase a temperature of the portion of the methanol, in the second tank, to generate vaporized methanol,
   wherein the heat exchanger is external with respect to the second tank, and
   wherein a pressure of the vaporized methanol causes the vaporized methanol to be provided from the second tank to an intake system associated with the engine;
a valve configured to control a flow of a portion of the vaporized methanol from the second tank to the first tank; and
a controller configured to control an operation of the valve.

15. The system of claim 14, further comprising:
a temperature sensor device configured to provide temperature data indicating the temperature of the vaporized methanol; and
a pressure sensor device configured to provide pressure data indicating the pressure of the vaporized methanol,
wherein, to control the operation of the valve, the controller is configured to:
   control the valve to cause the portion of the vaporized methanol to be provided from the second tank to the first tank when the temperature data indicates that the temperature of the vaporized methanol exceeds a temperature threshold or when the pressure data indicates that the pressure of the vaporized methanol exceeds a pressure threshold.

16. The system of claim 14, further comprising:
an electrical heating component configured to provide heat to the second tank in conjunction with a turbine of a turbocharger;
a temperature sensor device configured to provide temperature data indicating the temperature of the vaporized methanol; and
a pressure sensor device configured to provide pressure data indicating the pressure of the vaporized methanol,
wherein the controller is further configured to:
cause the electrical heating component to provide heat to the second tank when the temperature data indicates that the temperature of the vaporized methanol does not exceed a temperature threshold or when the pressure data indicates that the pressure of the vaporized methanol does not exceed a pressure threshold.

17. The system of claim 14, wherein the heat exchanger is provided in communication with the second tank and the exhaust gas.

18. The system of claim 14, wherein the valve is a first valve,
wherein the system further comprises a second valve configured to control a flow of the vaporized methanol from the second tank to the intake system via the second valve, and
wherein the second valve includes a gas admission valve (GAV) or a solenoidal gas admission valve (SOGAV).

19. The system of claim 18, wherein the controller is further configured to:
control a duration of an opening of the second valve based on at least one of:
temperature data indicating the temperature of the vaporized methanol, or
pressure data indicating the pressure of the vaporized methanol.

20. The system of claim 14, further comprising:
a pump configured to control a flow of the portion of the methanol from the first tank to the second tank.

* * * * *